United States Patent [19]

van der Zel

[11] Patent Number: 5,472,333
[45] Date of Patent: Dec. 5, 1995

[54] SPINNERETTE FROM GOLD-PLATINUM-PALLADIUM-RHODIUM ALLOY

[75] Inventor: Joseph M. van der Zel, Zwaag, Netherlands

[73] Assignee: Elephant Edelmetaal B.V., Netherlands

[21] Appl. No.: 149,389

[22] Filed: Nov. 9, 1993

[30] Foreign Application Priority Data

Nov. 9, 1992 [NL] Netherlands ............................ 9201956

[51] Int. Cl.$^6$ ................................ C22C 5/02; D01D 5/18
[52] U.S. Cl. ......................... 425/464; 425/72.2; 425/461; 420/509; 148/405
[58] Field of Search ...................... 148/405, 419, 148/430; 425/72.2, 378.2, 382.2, 461, 464; 264/176.1; 420/465, 467, 509

[56] References Cited

U.S. PATENT DOCUMENTS

| 1,169,753 | 1/1916 | Peschko. | |
|---|---|---|---|
| 2,566,283 | 8/1957 | Dowson | 148/405 |
| 2,938,788 | 5/1960 | Ruthardt | 148/405 |
| 4,062,676 | 12/1977 | Knosp | 420/509 |

FOREIGN PATENT DOCUMENTS

| 0346595 | 12/1989 | European Pat. Off.. | |
|---|---|---|---|
| 898019 | 4/1945 | France. | |
| 2133178 | 11/1972 | France. | |
| 221572 | 6/1909 | Germany. | |
| 1075838 | 6/1939 | Germany. | |
| 691061 | 4/1940 | Germany. | |
| 873145 | 2/1953 | Germany. | |
| 2053059 | 12/1971 | Germany. | |
| 62-112740 | 5/1987 | Japan | C22C 5/02 |
| 260672 | 11/1926 | United Kingdom. | |
| 1112766 | 5/1968 | United Kingdom. | |

*Primary Examiner*—David A. Simmons
*Assistant Examiner*—Margery S. Phipps
*Attorney, Agent, or Firm*—Stevens, Davis, Miller & Mosher

[57] ABSTRACT

A spinneret consisting essentially of an alloy consisting essentially of from 30–80 wt. % gold, 1–60 wt. % platinum, 1–50 wt. % palladium, 0.1–5 wt. % rhodium and 0–0.4 wt. % iridium and/or ruthenium, said alloy having a VICKERS hardness of from 145–340 after treatment for 5 hours at a temperature of from 500°–650° C.

2 Claims, No Drawings

SPINNERETTE FROM GOLD-PLATINUM-PALLADIUM-RHODIUM ALLOY

FIELD OF THE INVENTION

This invention relates to a method for manufacturing a product from a gold-platinum-palladium-rhodium alloy, in particular a spinnerette which is suitable for use in the production of synthetic fibers.

Synthetic fibers are obtained by "drawing" them, with or without pressure, from a complex chemical solution through a spinnerette with fine perforations or holes. These perforations are for instance punched out with the aid of a sapphire rod.

The following is expected from a good spinnerette:

1. a long standing time in the fiber press before it must be removed to be cleaned because of clogged holes;
2. it must consist of material that is sufficiently soft and homogeneous in annealed form to allow holes to be punched in as thick a plate as possible, in an economically acceptable way and with high precision, without the punches breaking unduly often;
3. after the holes have been pierced, and after a hardening/ heat treatment, an increase in hardness and strength should be attainable, such that it can remain in operation as long as possible, at the highest possible pressure, without thereby deforming;
4. it must possess a uniform structure so that corrosion is minimized.

Spinnerettes whose surface comprises as many as 15,000 holes of a diameter in the range of 40–120 μm play an important role in the production of artificial silk fibers and other synthetic fibers. There is a great need for even stronger and especially even stiffer alloys with a good corrosion resistance because with the same invested capital a higher production can be achieved with the same press through an increased allowable production pressure on the spinnerette. This gives proportionate economic advantages.

PRIOR ART

German patent specification 221,572 already discloses spinnerettes, which were manufactured from pure platinum at the time. However, they are too soft (Brinell hardness 40, equivalent to Vickers hardness HV 50), which also applies to the alloys from gold and 20–32% platinum described in British patent specification 260,672. Gold-platinum alloys appear to be especially suitable for making such spinnerettes in view of their resistance to corrosion. In the synthetic fiber industry, spinnerettes from gold-platinum alloys are used on a large scale. They are so popular because they are corrosion-resistant and hardenable in a large concentration range—from approximately 20 to 95% platinum. The possible hardening is caused by the occurrence of separation in the solidified melt of the alloy at lower temperatures. The highest hardness, both in homogenized and in hardened condition, occurs in alloys with 60–70% platinum. In practice, these alloys with an extremely high hardness are rarely used in connection with production problems. An optimum composition is rather in the neighborhood of 30–50% platinum.

Later, with 30% platinum, a Brinell hardness of at most 200 (Vickers hardness HV 220) could be attained. There were problems, however, caused by strong segregation during hardening, so that variations in hardness arose.

Mostly, to gold-platinum alloys rhodium is added, generally in an amount of 0.5–1%. Rhodium has a grain-refining effect. Alloys with 30% platinum obtain the highest hardness with addition of 1% rhodium. The elongation at break, too, is increased by the addition of rhodium. German patent specification 691,061 discloses gold-platinum alloys from 60–80% gold and 20–40% platinum, to which up to 1% rhodium is added.

German patent specification 873,145 discloses gold-platinum alloys with 50–93% Pt, intended for spinnerettes, and further suggests the addition of at most 1% rhodium to Au—Pt alloys with 40–50% Pt, for instance a gold-platinum alloy with 50% Au, 49% Pt and 1% Rh. Such an alloy, it is true, has a high hardness in hardened form, but it also has a high hardness in annealed form, which renders it more difficult for holes to be pierced. The holes can only be pierced in thin sheets for use at low pressure.

Gold-platinum alloys from 80.5–90% gold, 10–19.5% platinum and additions of 0–3% rhodium, iridium, ruthenium, osmium and/or rhenium are disclosed in French patent specification 2,133,178. British patent specification 1,112, 766 mentions a gold-platinum alloy from 50–80% gold, 0.04–0.5% iridium and the balance platinum. German patent application 1,075,838 discloses spinnerettes manufactured from a gold-platinum alloy comprising 32–39% platinum and up to 2% rhenium. A gold-platinum alloy with 3% gold, 85–87% platinum and 10–12% rhodium which is suitable for use as a spinnerette for glass fibers is disclosed in German patent application 2,053,059.

U.S. Pat. No. 1,169,753 to Peschko proposes an alloy for the manufacture of jewelry, instruments, dental restorations and electric equipment, comprising 10 parts of platinum, 30 parts of palladium and 60 parts of gold; if an increase of the strength is desired, then 0.1–2% of a hardening element such as ruthenium, iridium, osmium, or rhodium could be added for the purpose. The alloys are obtained by melting the metals together. Peschko apparently assumes that hardening elements are effective when they are simply added to the mixture to be melted and that hardening occurs automatically without the necessity of performing a prior homogenization annealing step for that purpose.

When rhodium is added, however, it is necessary that the metal be homogeneously distributed first, if any hardening effect of the addition is to be obtained. If the metal is not first distributed homogeneously, rhodium even leads to a reduction of the strength and the hardness. Nor is the hardening a matter of course. Rhodium often gives a reduction of the strength and the hardness. This is evident from a comparison of Examples 1 and 3 in Tables 1a and 1b with Examples 4 and 6 in the same Tables. Only in the case of the gold-platinum alloys with 25% and 30% platinum does rhodium give an increase of the hardness. In view of the high palladium content of approx. 30% in the alloy according to Peschko, a positive effect of rhodium on the hardness is not certain because palladium has an equalizing effect on the hardening response because palladium dissolves the rhodium and thereby reduces the hardening activity of rhodium.

The most used spinnerette alloy for spinning synthetic fibers is an alloy with 59.5% gold, 30% platinum and 0.5% rhodium. With this alloy, after a somewhat longer service time the metal proved to be selectively lixiviated at some points because of inhomogeneities present.

In the spinning of synthetic fibers, a polymer is pressed through a spinnerette in a medium consisting of a 40% sulfuric acid solution at 80° C. After the spinnerette has been in use, it is removed from the spinning press so as to be cleaned and treated with a bichromate/sulfuric acid solution at 90°–100° C.

From the above it can be inferred how corrosion-resistant the material should be. Therefore the alloys of the invention were subjected to a corrosion test and the results were compared with those of the alloys from which the spinnerettes now in use are manufactured.

SUMMARY OF THE INVENTION

The present invention provides a method for manufacturing a product, in particular a spinnerette, suitable for the production of synthetic fibers, from a gold-platinum-palladium-rhodium alloy which comprises 30–80 wt. % gold, 1–60 wt. % platinum, 1–50 wt. % palladium, 0.1–5 wt. % rhodium and 0– 0.4 wt. % iridium and/or ruthenium, comprising preparing a melt comprising requisite amounts of the alloy elements and casting the melt so as to form an ingot, as well as the steps of homogenizing through annealing, chilling, processing and age-hardening the alloy.

According to the invention, it is preferred that the alloy be composed of 50–70 wt. % Au, 20–40 wt. % Pt, 5–20 wt. % Pd, 0.3–1.5 wt. % Rh and 0–0.4 wt. % Ir and/or Ru, in particular from approximately 59 wt. % Au, approximately 30 wt. % Pt, approximately 10 wt. % Pd and approximately 1 wt. % Rh.

According to the invention, the homogenization is carried out by annealing at a temperature of 900°–1200° C., preferably at approximately 1150° C. According to the invention, chilling is preferably carried out by rapidly cooling the annealed product with water. The chilled product is processed by rolling it to a slighter thickness, preferably in several steps, with the product being annealed between these steps at 900°–1200° C., preferably at a temperature of approximately 950° C. The processing of the chilled product may comprise a punching treatment whereby the product is perforated. Finally, according to the invention, the processed product is hardened by an ageing treatment at a temperature of 400°–700° C., preferably at 500°–650° C.

The present invention further encompasses products, in particular spinnerettes, suitable for the production of synthetic fibers, which have been obtained by the use of the method of the present invention.

The present invention further provides a new gold-platinum-palladium-rhodium alloy comprising 50–70 wt. % gold, 20–40 wt. % platinum, 5–20 wt. % palladium, 0.3–1.5 wt. % rhodium and 0–0.4 wt. % iridium and/or ruthenium, in particular approximately 59 wt. % Au, approximately 30 wt. % Pt, approximately 10 wt. % Pd and approximately 1 wt. % Rh. Products, in particular spinnerettes, manufactured from such an alloy are also encompassed by the invention.

Finally, the invention encompasses a method for producing synthetic fibers by spinning synthetic material, utilizing a spinnerette according to the invention.

DETAILED DESCRIPTION OF THE INVENTION

The invention discloses that the existing ternary gold-platinum-rhodium alloys can be highly improved in physical properties by addition of palladium, without deterioration of the corrosion resistance of the alloy during the fiber production. Corrosion tests have demonstrated that the corrosion of the alloys 7, 10 and 11 was at the same level as that of the alloys 1–6. In the alloys with a higher palladium content (8 and 9), a slightly higher corrosion rate was found. In Tables 1a and 1b it can be seen how the physical and corrosion properties depend on the composition. Alloys 1–6 are existing spinnerette alloys. Alloys 7–11 are alloys according to the invention.

With the exception of the 25% and 30% platinum alloys, the rhodium-free alloys eventually attain a higher hardness than the rhodium-containing alloys. As regards tensile strength, the same applies as what has been said about the hardness, with the exception of the alloy with 30% platinum.

Although it could be expected that by the addition of palladium, due to the high dissolvent power of rhodium in palladium, the hardening activity of rhodium would decrease, it has now surprisingly been found that with a content of 10% palladium a very good hardening response is obtained, in spite of the fact that palladium generally reduces the separation of platinum in platinum-gold alloys. A condition for this appeared to be a rapid cooling after the homogenization treatment. In spite of the hardening response, after annealing so low a hardness can be attained that even thicker sheets, intended for production under high pressure, can still be properly pierced. Then the spinnerette can be hardened. Hardening takes place at a temperature which is mostly 50° C. higher than the prior art ternary gold-platinum-rhodium spinnerette alloys.

To achieve the desired optimum properties after hardening of these improved spinnerette alloys, it is of the utmost importance that the sheet be cooled rapidly, i.e., instantaneously, in water. If this happens too slowly, as in comparative example 2, then the hardening is very inefficient and the contemplated improvement of the properties is not achieved.

The hardening of the alloy expressed as the difference in hardness in soft condition for piercing the holes and the hardness in hardened condition for optimum condition of use, is highest in alloy 7, being preferred most, viz. Vickers hardness number 180. This means that the alloy is soft enough to be punched efficiently, i.e., that the sapphire punches do not break unduly often, whilst the alloy in the hardened condition of use has a high hardness with a correspondingly high strength. The soft condition makes that even thicker sheets, usable at a higher pressure during an increased production of the fibers, can yet be punched properly and efficiently, whilst the increased strength after hardening enables a higher pressure to be used during the fiber production. This implies proportionate economic advantages of the use of such an alloy.

Moreover, the alloys with palladium additive are considerably finer grained than the palladium-free alloys, which favorably influences the piercing of the holes, the polishing and the corrosion resistance.

Like the conventional ternary gold-platinum-rhodium alloys, quaternary gold-platinum-palladium-rhodium alloys prepared in accordance with the invention can be hardened. However, the improved alloys satisfy, to a greater degree than do the alloys hitherto available, the requirements that may be imposed on a spinnerette alloy. The alloys according to the invention have a uniform structure, in which an occurring second phase is very finely distributed through a gold-platinum-palladium matrix. The presence of rhodium in combination with palladium and platinum gives, surprisingly, a high degree of grain refinement and a good distribution of the platinum-rich hard second phase.

The major advantage of the alloys according to the invention is their higher elasticity modulus or Young's modulus in comparison with that of existing ternary gold-platinum-rhodium spinnerette alloys. This makes that the alloy yields to a lesser extent under the same load, which means that the spinnerette plate can be made thinner than with the existing alloys, or that, given the same thickness, a larger plate can be used, which yields a considerable production increase, than would have been possible with the existing alloys.

To the alloys up to 0.4% iridium and/or ruthenium can be added so as to obtain a structure of even finer grain.

EXAMPLE

A spinnerette alloy of the following composition (in percentages by weight): 59% gold, 30% platinum, 10% palladium and 1% rhodium was weighed out and melted in vacuo in an aluminum oxide crucible in a medium-frequency induction furnace until all of the components were dissolved. The components used had a purity of at least 99.95%.

Then at a bath temperature of 1600° C. the alloy was cast in a die of pure copper. The thus obtained bar was planed down on both sides, followed by annealing for 1 hour at 1150° C. and then chilled in water. Then the 15 mm thick bar was rolled in several steps to a final thickness of 1.0 mm and annealed in the interim for 15 minutes at 950° C. As a last step the plate was annealed at 1150° C. for 30 minutes and cooled very rapidly in water.

The hardness of the plate was measured with a micro Vickers hardness meter of Durimet (Leitz, Germany) with 1.0 kg load and showed a value of HV 160. After a hardening treatment at 600° C. for 5 hours the hardness was HV 340.

Then, with the aid of a tensile testing machine of Zwick (Germany) with extensometer, a tensile test was performed on a test plate. The tensile strength was 119 kg/mm$^2$ (1168 MPa), the 0.2% yielding point was 104 kg/mm$^2$ (1021 MPa), the Young's modulus was 140 GPa and the elongation at break was 7.8% (test sheet: width 8 mm, thickness 1.0 mm, length 30 mm).

Comparatives example 1

A sheet of a spinnerette alloy of the following composition (in percentages by weight): 69.5% gold, 30% platinum and 0.5% rhodium was produced as in Example 1. As a last step, the sheet was annealed for 30 minutes at 1100° C. and cooled very rapidly in water. The sheet showed a hardness of HV 134. After a hardening treatment at 550° C. for 5 hours, the hardness was HV 316, the tensile strength was 82 kg/mm$^2$ (800 MPa), the 0.2% yielding point was 72 kg/mm$^2$ (710 Mpa), the Young's modulus was 100 GPa and the elongation at break was 2%.

Comparative example 2

A sheet of a spinnerette alloy of the composition as in Example 1 was produced. As a last step, however, after annealing for 30 minutes at 1150° C., the sheet was cooled in the air for a few seconds before the plate was cooled in water. The plate showed a hardness of HV 185. After a hardening treatment for 5 hours at 550° C., the hardness was only HV 240, the tensile strength 72 kg/mm$^2$ (707 Mpa), the 0.2% yielding point was 64 kg/mm$^2$ (628 Mpa), the Young's modulus was 120 GPa and the elongation at break was 2%.

TABLE 1a

Gold-platinum spinnerette alloys: composition, hardening response and corrosion rate

| | Composition in wt. % | | | | | Vickers hardness, HV | | | | Corrosion in μg/cm2 |
| --- | --- | --- | --- | --- | --- | --- | --- | --- | --- | --- |
| | | | | | | | Hardening Temp. in °C. | | | |
| No | Au | Pt | Pd | Rh | Annealing | 500 | 550 | 600 | 650 | per day |
| 1 | 75 | 25 | — | — | 100 | 160 | 190 | 160 | 120 | 1 |
| 2 | 70 | 30 | — | — | 120 | 230 | 290 | 270 | 230 | 1 |
| 3 | 50 | 50 | — | — | 200 | 330 | 360 | 340 | 250 | 1 |
| 4 | 74.5 | 25 | — | 0.5 | 125 | 190 | 250 | 230 | 190 | 1 |
| 5 | 69.5 | 30 | — | 0.5 | 134 | 275 | 316 | 272 | 215 | 1 |
| 6 | 50 | 49 | — | 1.0 | 210 | 300 | 320 | 290 | 250 | 1 |
| 7 | 59 | 30 | 10 | 1.0 | 160 | 284 | 318 | 340 | 271 | 1 |
| 8 | 49 | 30 | 20 | 1.0 | 130 | 175 | 210 | 250 | 235 | 2 |
| 9 | 39 | 30 | 30 | 1.0 | 134 | 145 | 170 | 190 | 170 | 2 |
| 10 | 39 | 50 | 10 | 1.0 | 220 | 250 | 270 | 300 | 270 | 1 |
| 11 | 59.5 | 30 | 10 | 0.5 | 220 | 245 | 260 | 280 | 260 | 1 |

TABLE 1b

Gold-platinum spinnerette alloys: physical properties after optimum hardening (see also Table 1a).

| No | Vickers hardness HV | Young's modulus GPa | Tensile strength MPa | 0.2%-yield point MPa | Elongation at break % |
| --- | --- | --- | --- | --- | --- |
| 1 | 190 | 90 | 770 | 640 | 1.0 |
| 2 | 290 | 90 | 750 | 610 | 1.5 |
| 3 | 370 | 100 | 1700 | 1430 | 2.0 |
| 4 | 250 | 100 | 750 | 690 | 1.5 |
| 5 | 316 | 100 | 800 | 710 | 2.0 |
| 6 | 320 | 100 | 1500 | 1250 | 4.0 |
| 7 | 340 | 140 | 1168 | 1021 | 7.8 |
| 8 | 250 | 150 | 1000 | 870 | 8.2 |
| 9 | 190 | 170 | 900 | 790 | 9.3 |
| 10 | 300 | 140 | 900 | 800 | 7.3 |
| 11 | 280 | 140 | 900 | 810 | 6.2 |

I claim:

1. A spinneret consisting essentially of an alloy consisting essentially of 50–70 wt. % gold, 20–40 wt. % platinum, 5–20 wt. % palladium, 0.3–1.5 wt. % rhodium and 0–0.4 wt. % of at least one selected from the group consisting of iridium and ruthenium, said alloy having a Vickers hardness of from 145–340.

2. The spinneret of claim 1, wherein the alloy consists essentially of 59 wt. % Au, 30 wt. % Pt, 10 wt. % Pd and 1 wt. % Rh.

* * * * *